US012223363B2

(12) United States Patent
Huang et al.

(10) Patent No.: US 12,223,363 B2
(45) Date of Patent: Feb. 11, 2025

(54) PERFORMING WORKLOAD MIGRATION IN A VIRTUALIZED SYSTEM BASED ON PREDICTED RESOURCE DISTRIBUTION

(71) Applicant: EMC IP Holding Company LLC, Hopkinton, MA (US)

(72) Inventors: Jie Huang, Chengdu (CN); Guoping Guan, Chengdu (CN); Yunyun Duan, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 408 days.

(21) Appl. No.: 17/547,944

(22) Filed: Dec. 10, 2021

(65) Prior Publication Data
US 2022/0391253 A1 Dec. 8, 2022

(30) Foreign Application Priority Data
Jun. 2, 2021 (CN) .......................... 202110614177.0

(51) Int. Cl.
*G06F 9/50* (2006.01)
*G06F 9/455* (2018.01)
*G06F 9/48* (2006.01)
*G06N 3/08* (2023.01)

(52) U.S. Cl.
CPC .......... *G06F 9/505* (2013.01); *G06F 9/45533* (2013.01); *G06F 9/4875* (2013.01); *G06N 3/08* (2013.01)

(58) Field of Classification Search
None
See application file for complete search history.

(56) References Cited

U.S. PATENT DOCUMENTS

| 6,374,297 B1* | 4/2002 | Wolf ................... H04L 67/1008 709/201 |
| 6,442,663 B1* | 8/2002 | Sun ........................... G06F 9/54 711/202 |
| 6,970,425 B1* | 11/2005 | Bakshi ................ H04L 67/1008 709/225 |
| 7,665,092 B1* | 2/2010 | Vengerov .............. G06F 9/5088 718/105 |
| 8,307,359 B1* | 11/2012 | Brown ................ H04L 67/1097 718/1 |

(Continued)

*Primary Examiner* — Adam Lee
(74) *Attorney, Agent, or Firm* — BainwoodHuang

(57) ABSTRACT

Techniques for managing resources of a virtualized system involve acquiring historical distribution data about a virtualized system, the historical distribution data indicating a historical distribution of resources occupied by workloads on a plurality of host machines of the virtualized system over a predetermined historical time period. The techniques further involve generating predicted distribution data based on the historical distribution data, the predicted distribution data indicating an estimated distribution of resources occupied by the workloads on the plurality of host machines over a predetermined future time period. The techniques further involve performing workload migration at least once based on the predicted distribution data, the workload migration including migrating a workload of a first host machine whose first estimated quantity of occupied resources exceeds a high threshold to a second host machine whose second estimated quantity of occupied resources is below a low threshold.

12 Claims, 10 Drawing Sheets

(56) References Cited

U.S. PATENT DOCUMENTS

| | | | |
|---|---|---|---|
| 9,438,466 B1* | 9/2016 | O'Gorman | H04L 69/329 |
| 9,477,532 B1* | 10/2016 | Hong | G06F 9/4881 |
| 9,503,310 B1* | 11/2016 | Hawkes | G06F 9/45558 |
| 9,830,192 B1 | 11/2017 | Crouchman et al. | |
| 10,725,885 B1* | 7/2020 | Paraschiv | G06F 11/3433 |
| 11,169,835 B1* | 11/2021 | Duong | G06F 9/4856 |
| 11,281,484 B2 | 3/2022 | Bafna et al. | |
| 2005/0108712 A1* | 5/2005 | Goyal | G06F 9/5083 718/100 |
| 2005/0215265 A1* | 9/2005 | Sharma | H04W 36/22 455/450 |
| 2006/0168107 A1* | 7/2006 | Balan | G06F 9/5083 709/218 |
| 2007/0250929 A1* | 10/2007 | Herington | G06F 21/566 726/24 |
| 2009/0228589 A1* | 9/2009 | Korupolu | H04L 67/1097 709/226 |
| 2010/0115049 A1* | 5/2010 | Matsunaga | G06F 9/45558 718/1 |
| 2010/0180025 A1* | 7/2010 | Kern | G06F 11/349 709/224 |
| 2010/0242045 A1* | 9/2010 | Swamy | G06F 9/455 718/1 |
| 2010/0262974 A1* | 10/2010 | Uyeda | G06F 9/4856 718/105 |
| 2011/0099550 A1* | 4/2011 | Shafi | G06F 11/323 718/102 |
| 2011/0131569 A1* | 6/2011 | Heim | G06F 9/45558 718/1 |
| 2011/0314345 A1* | 12/2011 | Stern | G06F 11/3466 718/1 |
| 2012/0026870 A1* | 2/2012 | Challa | H04L 67/1034 370/230 |
| 2012/0054771 A1* | 3/2012 | Krishnamurthy | G06F 9/4881 718/105 |
| 2012/0137012 A1* | 5/2012 | Stewart | G06F 9/5061 709/230 |
| 2012/0324445 A1* | 12/2012 | Dow | G06F 9/45504 718/1 |
| 2013/0054809 A1* | 2/2013 | Urmanov | G06F 9/5083 709/226 |
| 2013/0111033 A1* | 5/2013 | Mao | G06F 9/5027 709/226 |
| 2013/0145364 A1* | 6/2013 | Yang | G06F 9/45558 718/1 |
| 2013/0145365 A1* | 6/2013 | Yang | G06F 9/45558 718/1 |
| 2013/0160003 A1* | 6/2013 | Mann | G06F 9/5088 718/1 |
| 2013/0212349 A1* | 8/2013 | Maruyama | G06F 11/3452 711/167 |
| 2013/0239119 A1* | 9/2013 | Garg | G06F 9/5083 718/105 |
| 2013/0312005 A1* | 11/2013 | Chiu | G06F 3/0685 718/105 |
| 2014/0019989 A1* | 1/2014 | Suzuki | G06F 9/5088 718/105 |
| 2014/0344337 A1* | 11/2014 | Sramka | G06F 9/547 709/203 |
| 2015/0169369 A1* | 6/2015 | Baskaran | G06F 9/4881 718/102 |
| 2016/0094401 A1* | 3/2016 | Anwar | G06F 11/3006 709/223 |
| 2016/0212202 A1* | 7/2016 | Birkestrand | H04L 67/1008 |
| 2016/0226789 A1* | 8/2016 | Sundararajan | G06F 9/5088 |
| 2016/0378531 A1* | 12/2016 | Dow | G06F 9/45558 718/1 |
| 2017/0126795 A1* | 5/2017 | Kumar | H04L 67/1008 |
| 2017/0147399 A1* | 5/2017 | Cropper | G06F 9/45533 |
| 2017/0315836 A1* | 11/2017 | Langer | G06F 9/45558 |
| 2017/0315838 A1* | 11/2017 | Nidugala | H04L 43/0817 |
| 2018/0004425 A1* | 1/2018 | Suzuki | G06F 11/3034 |
| 2018/0060134 A1* | 3/2018 | Bianchini | G06F 9/5061 |
| 2018/0121100 A1* | 5/2018 | Auvenshine | G06F 3/0611 |
| 2019/0332276 A1* | 10/2019 | Gupta | G06F 3/0655 |
| 2019/0363905 A1* | 11/2019 | Yarvis | G06F 8/60 |
| 2020/0004601 A1* | 1/2020 | Ahmad | G06F 11/3003 |
| 2020/0019841 A1* | 1/2020 | Shaabana | G06N 3/08 |
| 2020/0065125 A1* | 2/2020 | Zheng | G06F 9/45558 |
| 2021/0173687 A1* | 6/2021 | Bade | G06F 9/4856 |
| 2021/0173782 A1* | 6/2021 | Krasner | G06F 12/0223 |
| 2021/0241929 A1 | 8/2021 | Vishwakarma et al. | |
| 2021/0271504 A1 | 9/2021 | Yu et al. | |
| 2021/0326275 A1* | 10/2021 | Anirudhan | G06F 11/3034 |
| 2022/0004941 A1* | 1/2022 | Wu | G06N 3/08 |
| 2022/0164681 A1 | 5/2022 | Aurongzeb | |
| 2023/0367649 A1* | 11/2023 | Wu | G06F 9/45558 |

\* cited by examiner

PERFORMING WORKLOAD MIGRATION IN A VIRTUALIZED SYSTEM BASED ON PREDICTED RESOURCE DISTRIBUTION

CROSS-REFERENCE TO RELATED APPLICATION

This application claims priority to Chinese Patent Application No. CN202110614177.0, on file at the China National Intellectual Property Administration (CNIPA), having a filing date of Jun. 2, 2021, and having "METHOD OF RESOURCE MANAGEMENT OF VIRTUALIZED SYSTEM, ELECTRONIC DEVICE AND COMPUTER PROGRAM PRODUCT" as a title, the contents and teachings of which are herein incorporated by reference in their entirety.

TECHNICAL FIELD

Embodiments of the present disclosure relate to the field of virtualized systems and, more specifically, to a method, an electronic device, and a computer program product for managing resources of a virtualized system.

BACKGROUND

With the help of virtualization technology, users can create multiple simulation environments or dedicated resources based on a single physical hardware system. With a virtual machine monitoring program, a system can be divided into different and individually secured environments, i.e., virtual machines (VMs). A virtual machine monitoring component can separate computer resources from hardware and properly allocate the resources. Here, the allocation and scheduling of resources occupied by workloads is important for virtualized systems.

SUMMARY OF THE INVENTION

In a first aspect of the present disclosure, a method for managing resources of a virtualized system is provided, including: acquiring historical distribution data about a virtualized system, the historical distribution data indicating a historical distribution of resources occupied by workloads on a plurality of host machines of the virtualized system over a predetermined historical time period; generating predicted distribution data based on the historical distribution data, the predicted distribution data indicating an estimated distribution of resources occupied by the workloads on the plurality of host machines over a predetermined future time period; and performing workload migration at least once based on the predicted distribution data, the workload migration including migrating a workload of a first host machine whose first estimated quantity of occupied resources exceeds a high threshold to a second host machine whose second estimated quantity of occupied resources is below a low threshold.

In the second aspect of the present disclosure, an electronic device is provided, including: a processor; and a memory coupled to the processor, the memory having instructions stored therein that, when executed by the processor, cause the device to execute actions including: acquiring historical distribution data about a virtualized system, the historical distribution data indicating a historical distribution of resources occupied by workloads on a plurality of host machines of the virtualized system over a predetermined historical time period; generating predicted distribution data based on the historical distribution data, the predicted distribution data indicating an estimated distribution of resources occupied by the workloads on the plurality of host machines over a predetermined future time period; and performing workload migration at least once based on the predicted distribution data, the workload migration including migrating a workload of a first host machine whose first estimated quantity of occupied resources exceeds a high threshold to a second host machine whose second estimated quantity of occupied resources is below a low threshold.

In a third aspect of the present disclosure, a computer program product is provided. The computer program product is tangibly stored on a computer-readable medium and includes machine-executable instructions, wherein the machine-executable instructions, when executed, cause a machine to perform the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other objectives, features, and advantages of the present disclosure will become more obvious by describing example embodiments of the present disclosure in more detail with reference to the accompanying drawings. In the example embodiments of the present disclosure, the same reference numerals generally represent the same members. In the accompanying drawings.

DETAILED DESCRIPTION

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to several example embodiments shown in the accompanying drawings. Although preferred embodiments of the present disclosure are shown in the accompanying drawings, it should be understood that these embodiments are described merely to enable those skilled in the art to better understand and then implement the present disclosure, and do not to limit the scope of the present disclosure in any way.

The term "include" and variants thereof used herein indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects. Other explicit and implicit definitions may also be included below.

Example Environment

Figure 1:
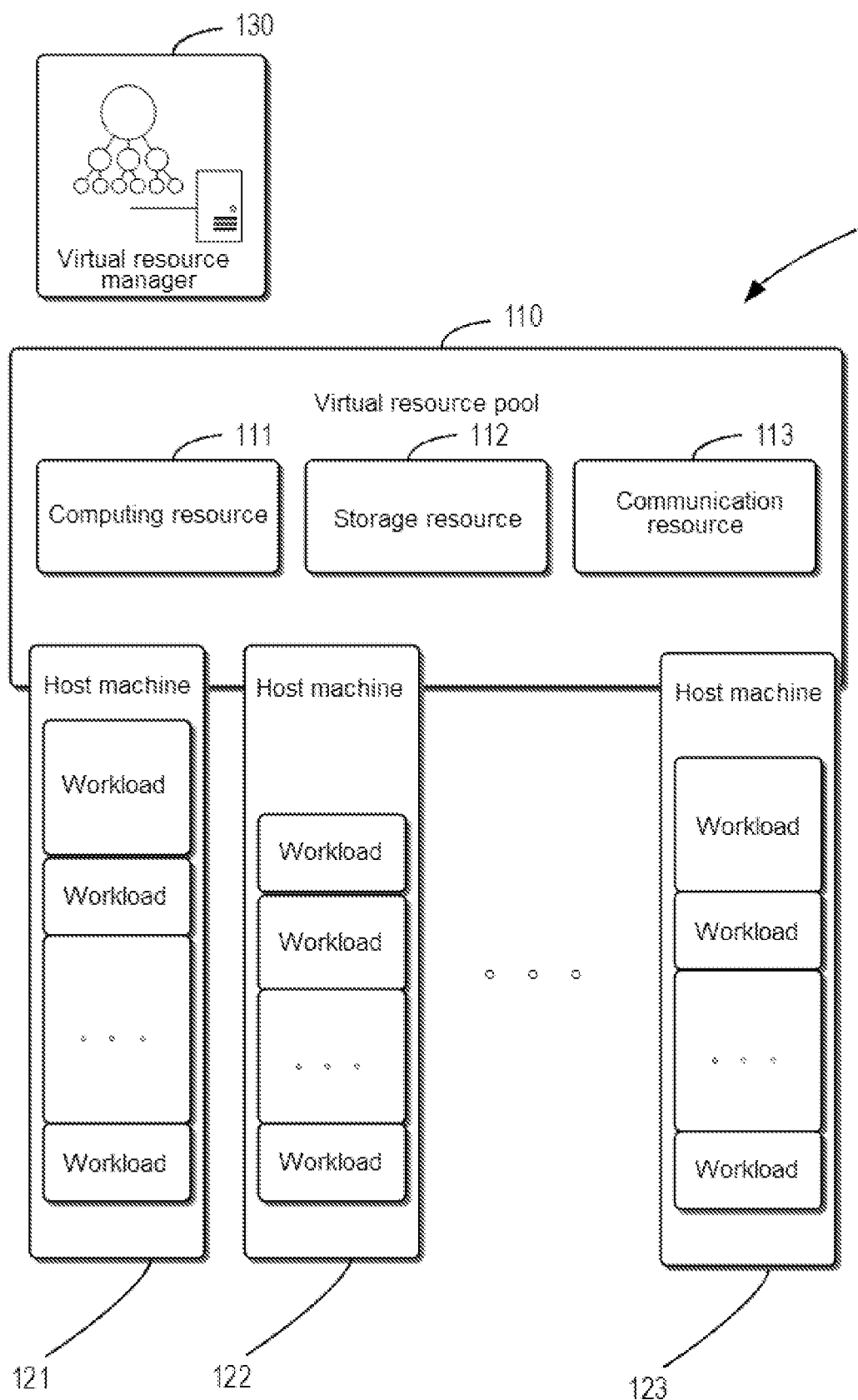
FIG. 1 illustrates a schematic diagram of a storage system in which embodiments of the present disclosure can be implemented.

FIG. 1 illustrates a schematic diagram of virtualized system 100 in which embodiments of the present disclosure can be implemented. Virtualized system 100 includes virtual resource pool 110, a plurality of host machines 121-123, and virtual resource manager 130. Virtual resource manager 130 selects, based on resource requirements of workloads submitted by a user, an appropriate physical machine in the resource pool as a host machine, and creates a virtual machine on the host machine, including configuring virtual hardware, an operating system, and necessary applications for implementing cloud services for the virtual machine. As shown in FIG. 1, there are a plurality of host machines in virtualized system 100. There are a plurality of workloads running on each host machine, and each workload occupies a respective quantity of resources. The workloads can be, for example, virtual machines or any applications deployed on the host machines.

Virtual resource manager 130 includes, for example, a hardware layer, which may include a processor, an input/output interface, a memory, and a network interface, and the components may communicate with each other via a system bus. The processor can be implemented using a CPU, a Microcontroller Unit (MCU), an Application Specific Integrated Circuit (ASIC), or a Field Programmable Gate Array (FPGA). The input/output interface can be implemented using input/output devices such as a display, a touch screen, a speaker, etc.

The memory can be implemented using non-volatile storage media such as a flash memory, a hard disk, an optical disc, etc., or volatile storage media such as a Double Data Rate (DDR) dynamic cache, where executable instructions are stored to execute the above host machine management method.

The network interface provides the processor with an access capability based on Transfer Control Protocol (TCP)/User Datagram Protocol (UDP) for external data such as a memory set at a different place.

A virtual machine (VM) is a complete computer system that is simulated by software, has complete hardware system functions, and runs in a completely isolated environment of a physical machine. The virtual machine is a tightly isolated software container that can run its own operating system and applications as if it were a physical computer. The virtual machine operates exactly like a physical computer and contains its own various virtual hardware (i.e., implemented based on software), including a CPU, a memory, a hard disk, and network interfaces.

A host machine is a physical machine (physical host) where the virtual machine (software) is to be run, for example, computing devices such as servers, personal computers, etc., and one or more virtual machines can be run in the physical machine.

Virtual resource manager 130 can schedule the resources of the host machines according to the resources to be occupied by the workloads so that the quantities of occupied resources of the host machines are as balanced as possible.

Herein, the quantity of resources is a quantitative representation of the resources in various dimensions provided by the physical machine for running the host machine, which mainly quantitatively represents computing resources, communication resources, storage resources, and the like. For example:

For example, resources related to computing resources include, but are not limited to: a processor: a main frequency, the number of cores, the number of threads, an external frequency, a level-1 cache, a level-2 cache, and a level-3 cache; the ability to support hyperthreading; the ability to support core graphics cards; memory capacity and operating frequency of a memory; and graphics card types (such as discrete graphics card and core graphics card), video memory capacity, video memory frequency, video memory bit width, and so on.

Resources related to communication resources include: network access types, such as fiber access, cable access, and so on; the network bandwidth, such as 30 megabits per second.

Resource factors related to storage resources include: the capacity of the memory; and storage medium types, such as mechanical hard disk, solid state disk, and so on.

Conventionally, the balance problem of virtualized resources can be categorized as a packing problem, which means a combinatorial optimization problem of migrating workloads to appropriate host machines, i.e., for resource balancing, a problem of migrating workloads across host machines to balance the quantities of resources occupied by the host machines. For the packing problem, greedy algorithms are usually used, i.e., when migrating resource workloads, the workloads are ranked and are migrated to the host machine with the most remaining resources each time.

However, since the greedy algorithms only consider the "greediest" (completing as many workloads as possible) solution at each step, there is no global planning, and as a result, many migration steps are required. Therefore, it is expected to achieve the balancing of resources with as few migration steps as possible.

Resource Management

Embodiments of the present disclosure propose a solution for migrating workloads between host machines that occupy a larger quantity of resources and host machines that occupy a smaller quantity of resources in an iterative manner using a predicted resource distribution.

In general, according to the embodiments described herein, by performing migration at least once between host machines that occupy more resources and host machines that occupy fewer resources, it is possible to keep the quantity of resources occupied by the host machines out of which workloads are migrated and the quantity of resources occupied by the host machines into which workloads are migrated as close as possible. In this way, it is possible to achieve an approximate balance of resources occupied by the host machines with a small number of migration steps. The solution according to the present disclosure is non-greedy and near-balanced, and may adapt to future trends in resource changes, thus saving significant system resources and reducing the opportunity of competition for system resources.

Figure 2:
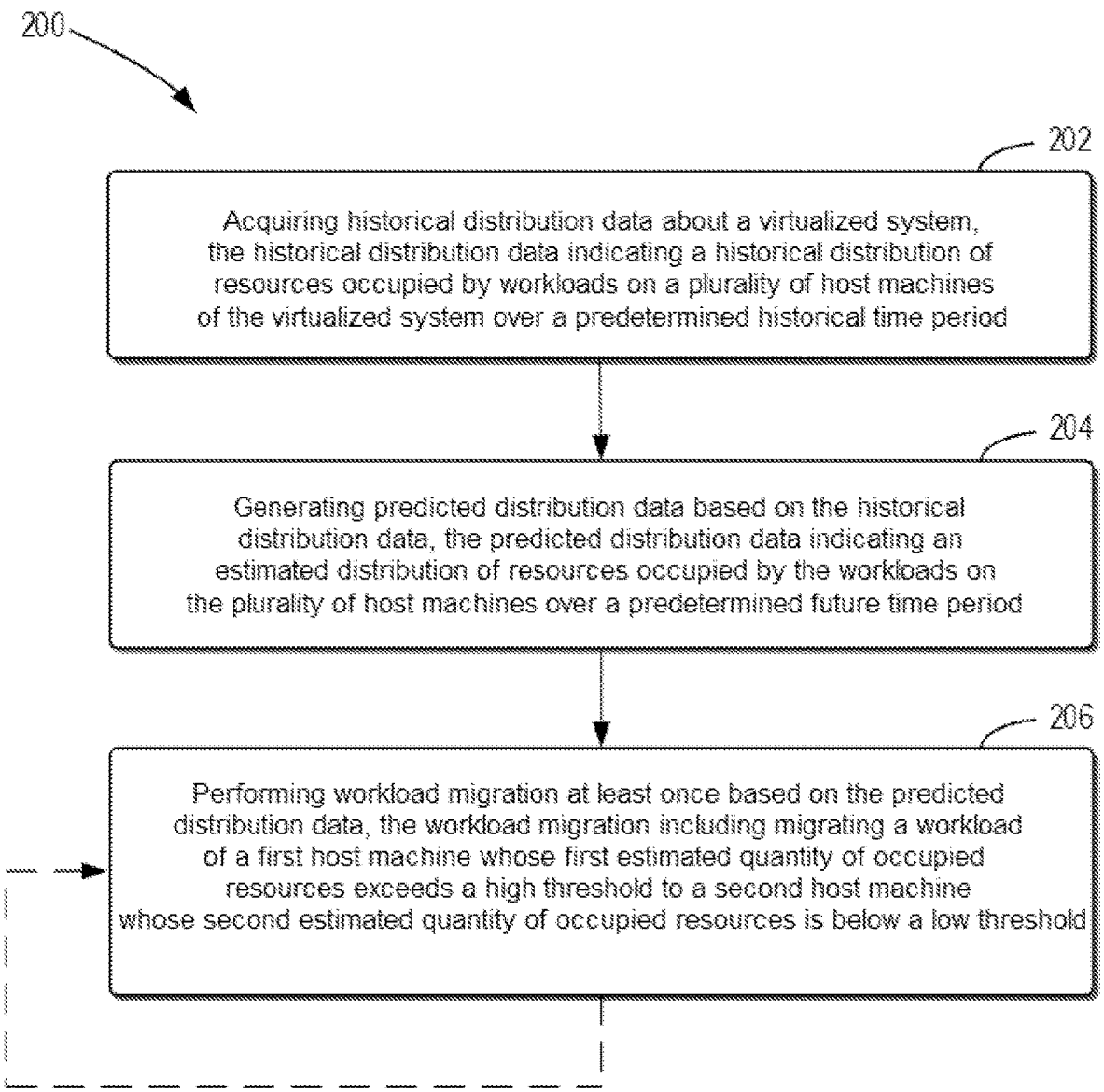
FIG. 2 illustrates a flow chart of an example method for managing resources of a virtualized system according to embodiments of the present disclosure.

FIG. 2 illustrates a flow chart of method 200 for managing resources of a virtualized system according to embodiments of the present disclosure. Method 200 can be performed, for example, by virtual resource manager 130 in FIG. 1.

At block 202, historical distribution data about a virtualized system is acquired, the historical distribution data indicating a historical distribution of resources occupied by workloads on a plurality of host machines of the virtualized system over a predetermined historical time period.

For example, in some embodiments, the distribution data about the resources on the host machines can be stored locally at the virtualized system. In some embodiments, the predetermined historical time period may be several minutes, tens of minutes, several hours, or several days prior to the current time, and so forth. In this regard, FIG. 3A illustrates an example historical distribution of resources across a plurality of host machines in a virtualized system according to embodiments of the present disclosure.

Figure 3A:
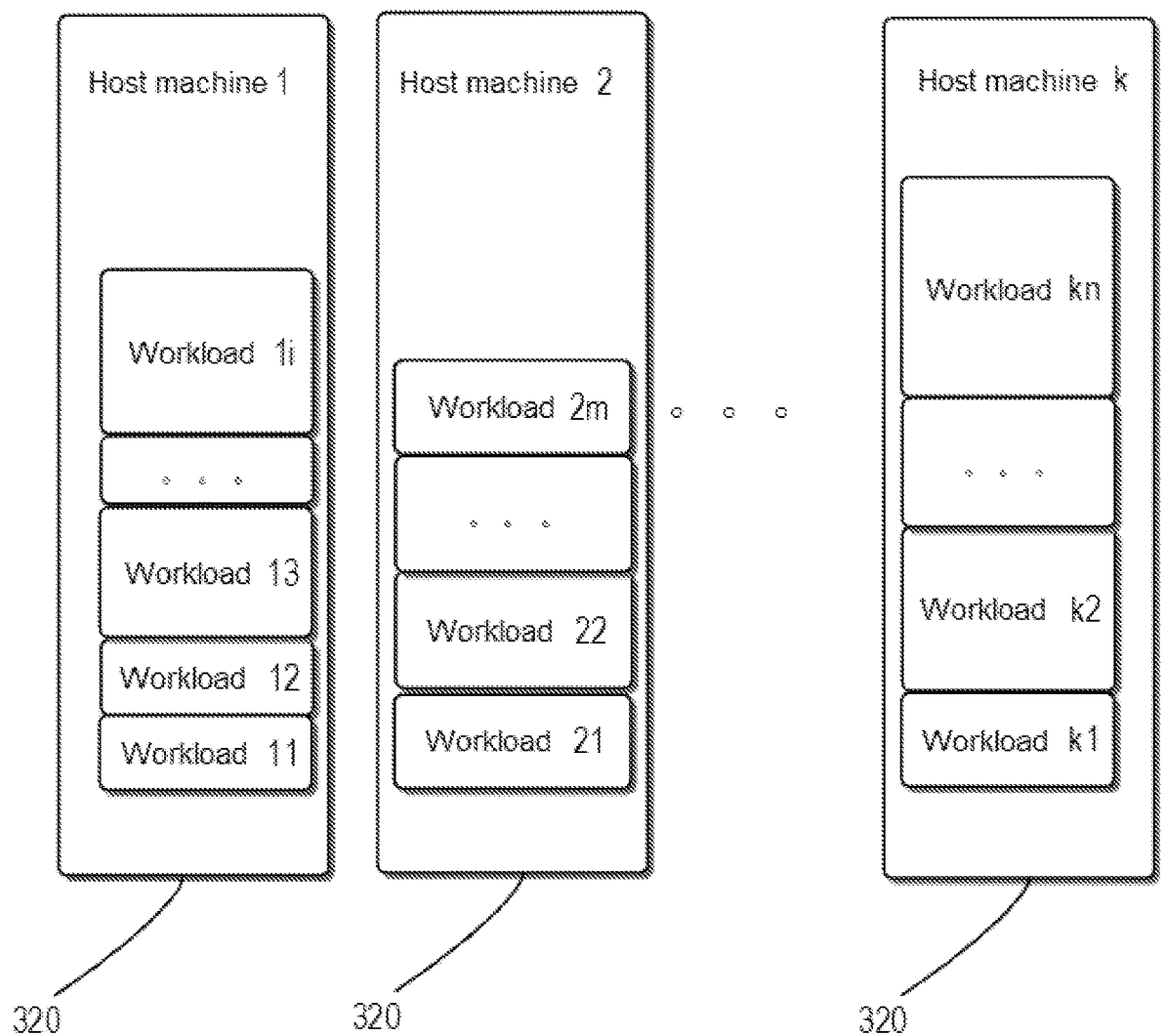
FIG. 3A illustrates a schematic diagram of an example historical distribution according to embodiments of the present disclosure.

In the example shown in FIG. 3A, the virtualized system includes host machine 320-1, host machine 320-2, and host machine 320-$k$, where K is any appropriate natural number. Workload 11, workload 12, . . . , and workload 1$i$ are run on host machine 1; Workload 21, workload 22, . . . , and workload 2$m$ are run on host machine 2; Workload k1, workload k2, . . . , and workload kn are run on host machine k; where i, m, and n are natural numbers representing the total numbers of workloads on host machine 1, host machine 2, and host machine k, respectively. In FIG. 3A and the accompanying figures that follow, the size of a block occupied by a workload schematically corresponds to the quantity of resources it occupies.

Returning to FIG. 2, at block 204, predicted distribution data is generated based on the historical distribution data, the predicted distribution data indicating an estimated distribution of resources occupied by the workloads on the plurality of host machines over a predetermined future time period.

In some embodiments, the predicted distribution data can be generated by using the historical distribution data as a long short-term memory (LSTM) machine learning model. The LSTM machine learning model is trained using historical distribution data over a historical time period and then outputs, when a future time point is given, the estimated distribution data at that future time point.

Conventionally, predictions of the resource distribution are obtained based on data in a relatively short period of time. For example, the predicted distribution can be for 1 to 5 minutes in the future, which means that future resource trends are not taken into account. However, the long-term trend of changes in the resource distribution is critical to resource balance, so this will reduce the accuracy of subsequent resource management.

In some embodiments, historical distribution data over X days can be used as input data, and the estimated distribution data for Y days can be predicted by the LSTM machine learning model, where X and Y are any appropriate natural numbers. By predicting the estimated distribution data for several days, the long-term trend of changes in the resource distribution can be obtained, thus improving the accuracy of the predicted data. In some embodiments, X and Y can be optimized through repeated training and adjustment, thereby improving the accuracy of the prediction.

Figure 4:
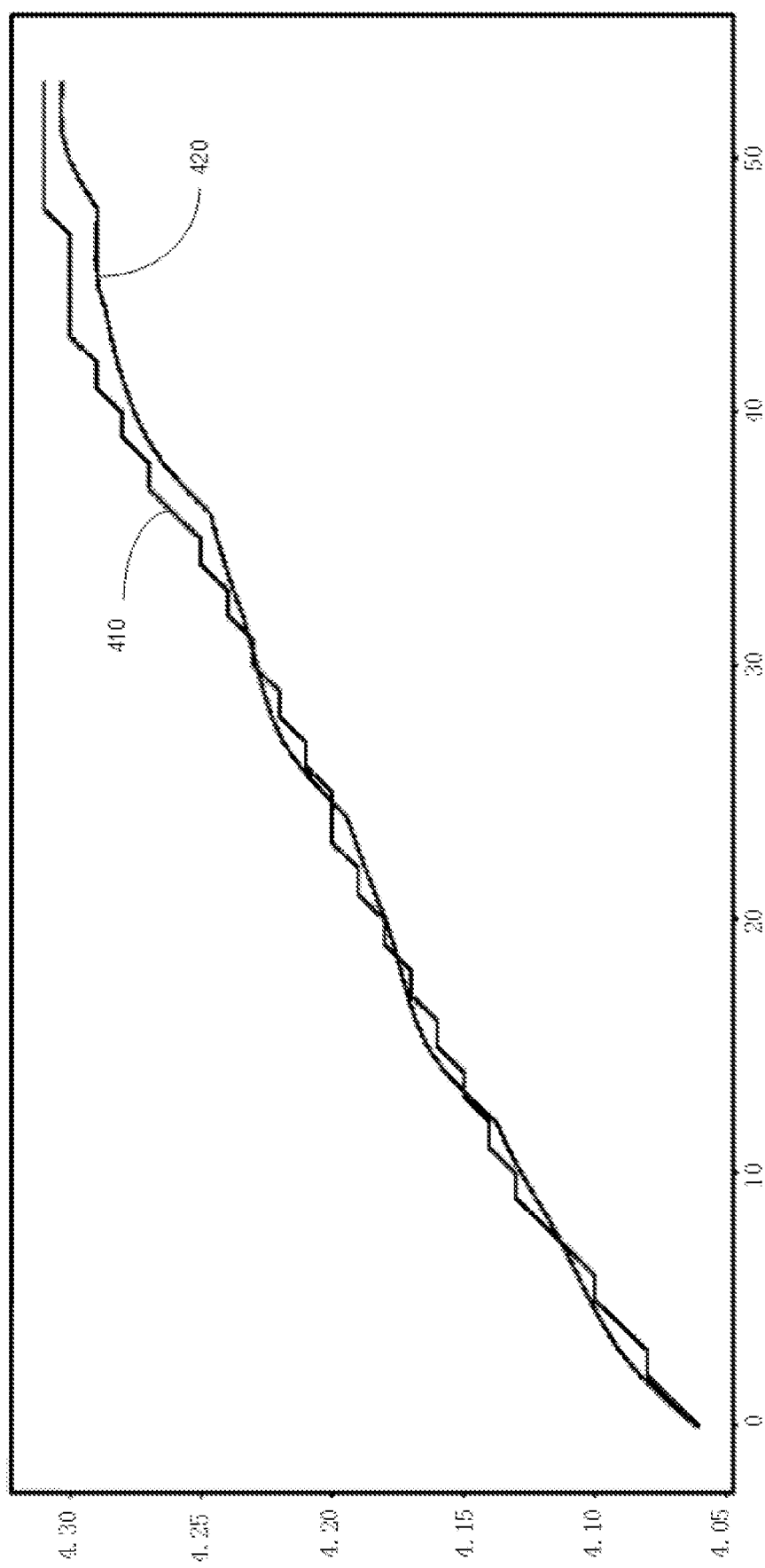
FIG. 4 illustrates a graph of predicted data results according to embodiments of the present disclosure.

FIG. 4 illustrates a graph of example estimated distribution data for 1 day in the future that is predicted using an LSTM machine learning model with historical distribution data over the past 30 days, where 410 is the curve for the test data and 420 is the curve for the predicted data. It can be seen that the LSTM machine learning model used here can well predict the trend of changes in data.

Figure 3B:
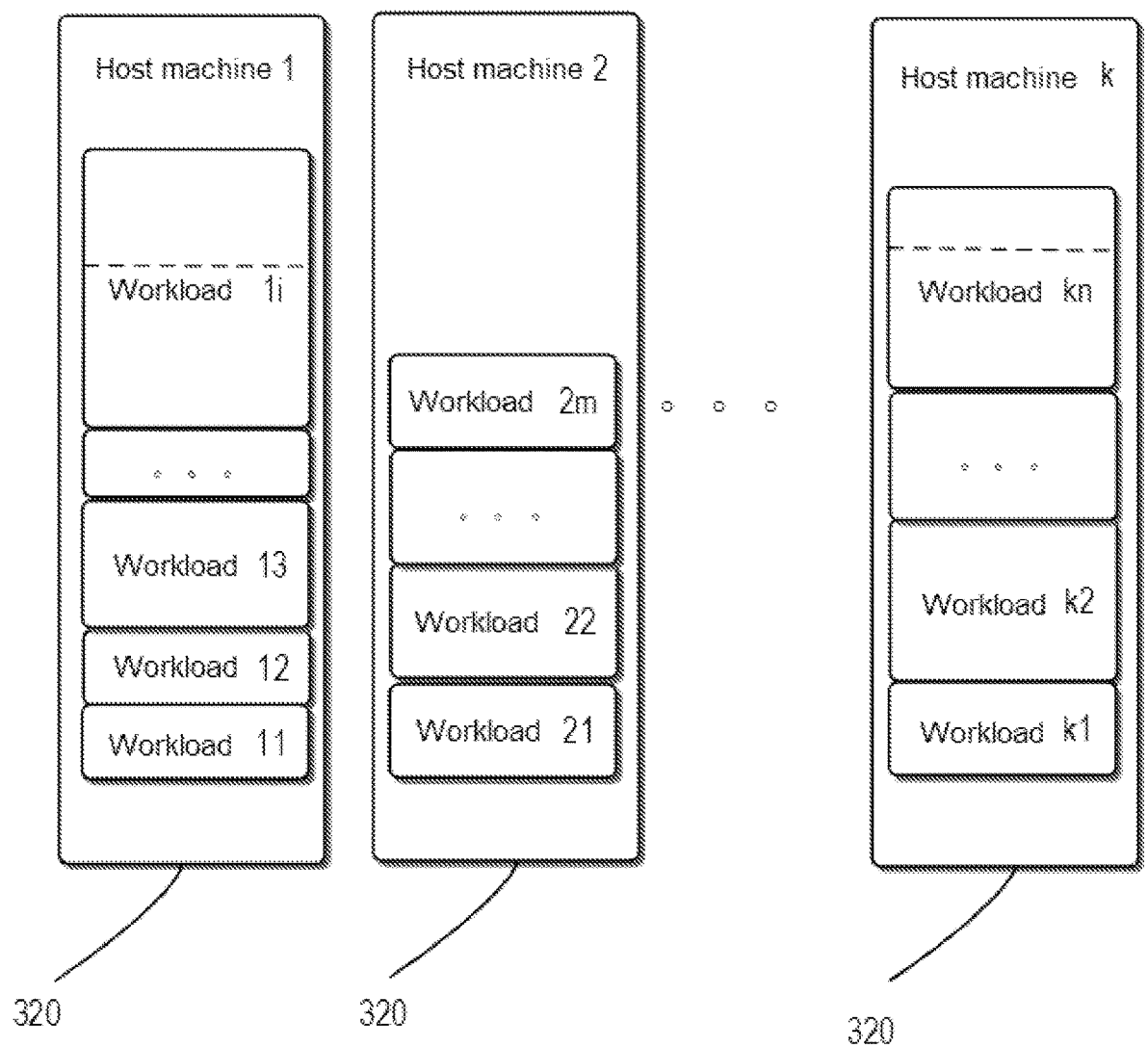
FIG. 3B illustrates a schematic diagram of an example estimated distribution that is predicted according to embodiments of the present disclosure.

An example predicted distribution will be described below with reference to FIG. 3B. FIG. 3B illustrates a predicted and example estimated distribution of resources across a plurality of host machines in a virtualized system according to embodiments of the present disclosure.

In the example shown in FIG. 3B, host machine 320-1, host machine 320-2, and host machine 320-$k$ correspond to corresponding host machines in FIG. 3A, respectively. At a time point in the future time period, there are the same number of workloads running on host machine 320-1, host machine 320-2, and host machine 320-$k$ as there were in the case shown in FIG. 3A. It should be understood that the number of workloads on the host machines may change at a future time point, and this situation also applies to embodiments of the present disclosure. After the prediction, the resources occupied by the workloads on the various host machines changed. As shown in FIG. 3B, at this future time point, the resources occupied by workload 1$i$ and workload k$i$ increase, where the dashed lines in the figure represent the quantity of occupied resources at a historical time point when the prediction was made.

Returning to FIG. 2, at block 206, workload migration is performed at least once based on the predicted distribution data, the workload migration including migrating a workload of a first host machine whose first estimated quantity of occupied resources exceeds a high threshold to a second host machine whose second estimated quantity of occupied resources is below a low threshold.

It will be understood that, by performing workload migration between host machines that occupy more resources and host machines that occupy fewer resources, the resources occupied across the host machines are balanced to some extent after each migration.

In some embodiments, the high threshold and the low threshold may be set based on the total quantities of resources occupied by the host machines. For example, a specific number of host machines with the largest total quantity can be determined based on the predicted distribution data, and the high threshold can be set based on this to include that specific number of host machines. Correspondingly, a specific number of host machines with the smallest total quantity can be determined, and the low threshold can be set based on this to include that specific number of host machines.

In some embodiments, a first host machine whose estimated quantity of occupied resources exceeds the high threshold is the host machine with the largest estimated quantity of occupied resources, and a second host machine whose estimated quantity of occupied resources is below the low threshold is the host machine with the smallest estimated quantity of occupied resources. In some embodiments, after the first host machine and the second host machine are selected, one or more workloads are selected from the first host machine and migrated to the second host machine. In some embodiments, after performing workload migration, the high and low thresholds are reset based on the resource distribution after the previous workload migration, and among all the host machines, host machines whose estimated quantities of occupied resources exceed the high threshold and host machines whose estimated quantities of occupied resources are below the low threshold are selected again.

In some embodiments, a specific workload for migration can be determined among the workloads on the first host machine. For example, a most appropriate workload can be determined in the first host machine, wherein compared with other workloads in the first host machine, the residual quantity of occupied resources of the second host machine after the most appropriate workload is migrated in is closest to the average of the first estimated quantity of occupied resources and the second estimated quantity of occupied resources. In some embodiments, the workload for migration is migrated from the first host machine to the second host machine such that the difference between a residual first quantity of occupied resources of the first host machine after the workload for migration is migrated out and a residual second quantity of occupied resources of the second host machine after the workload for migration is migrated in is below a threshold. By setting the threshold, the workload to be migrated can be selected based on situations. For example, the threshold can be set as small as possible, thus ensuring that the residual first quantity of occupied resources is as close as possible to the residual second quantity of occupied resources, thereby reducing the migration steps.

In some embodiments, workload migration may include a determination operation to determine whether to perform workload migration. For example, the workload migration can be stopped in response to determining that the quantity of resources occupied by the workloads on the first host machine is higher than the difference between the first estimated quantity of occupied resources and the second estimated quantity of occupied resources. In this way, it can be determined that there are no workloads in the first host machine that are suitable for migration. In this case, for example, workload migration can be re-performed.

Figure 3C:
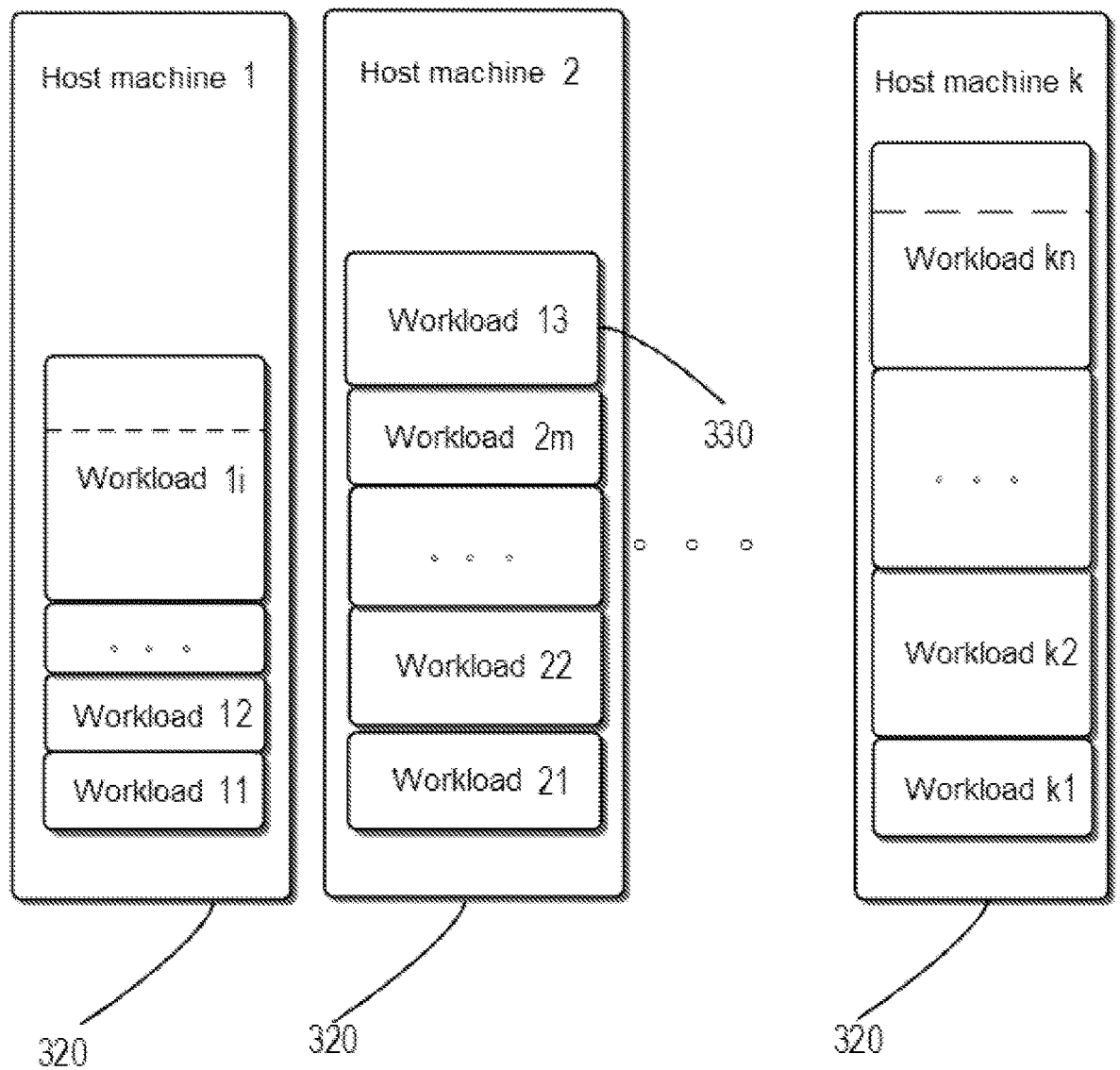
FIG. 3C illustrates a schematic diagram of a resource distribution after a first workload migration according to embodiments of the present disclosure.
Figure 3D:
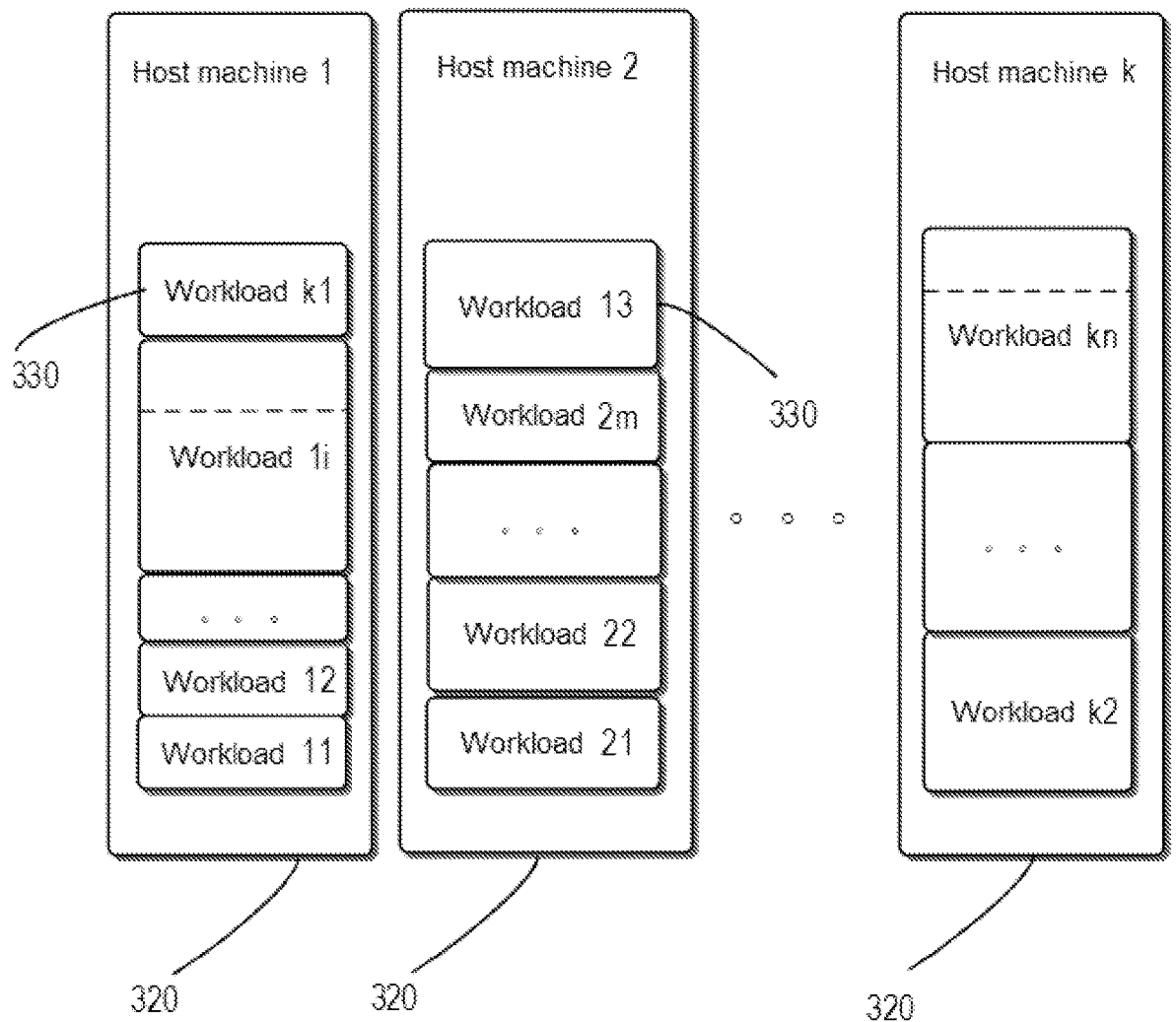
FIG. 3D illustrates a schematic diagram of the resource distribution after a second workload migration according to embodiments of the present disclosure.

An example workload migration process will be described below with reference to FIGS. 3C and 3D. FIG. 3C illustrates the resource distribution after the first workload migration, and FIG. 3D illustrates the resource distribution after the second workload migration.

Based on the predicted distribution data shown in FIG. 3B, the first host machine, i.e., host machine 320-1, that exceeds the high threshold is determined, and the second host machine, i.e., host machine 320-2, that is below the low threshold is determined. As shown in FIG. 3C, workload 330-13 is selected from the workloads in host machine 1 and migrated to host machine 2. At this point, the first workload migration is completed. The second workload migration is executed below.

Here, based on the resource distribution shown in FIG. 3C, the first host machine, i.e., host machine 320-$k$, that exceeds the high threshold is determined, and the second host machine, i.e., host machine 320-1, that is below the low threshold is determined. Then referring to FIG. 3D, workload 330-$k$1 is selected among the workloads of host machine 320-$k$ and migrated to host machine 320-1. It can be seen that, after the second migration, the total quantities of resources occupied by host machine 320-1, host machine 320-2, and host machine 320-$k$ are almost the same, and the differences between the total quantities of resources of every two of host machine 320-1, host machine 320-2, and host machine 320-$k$ are very small at this point, thus reaching an approximate resource balance.

Figure 5:
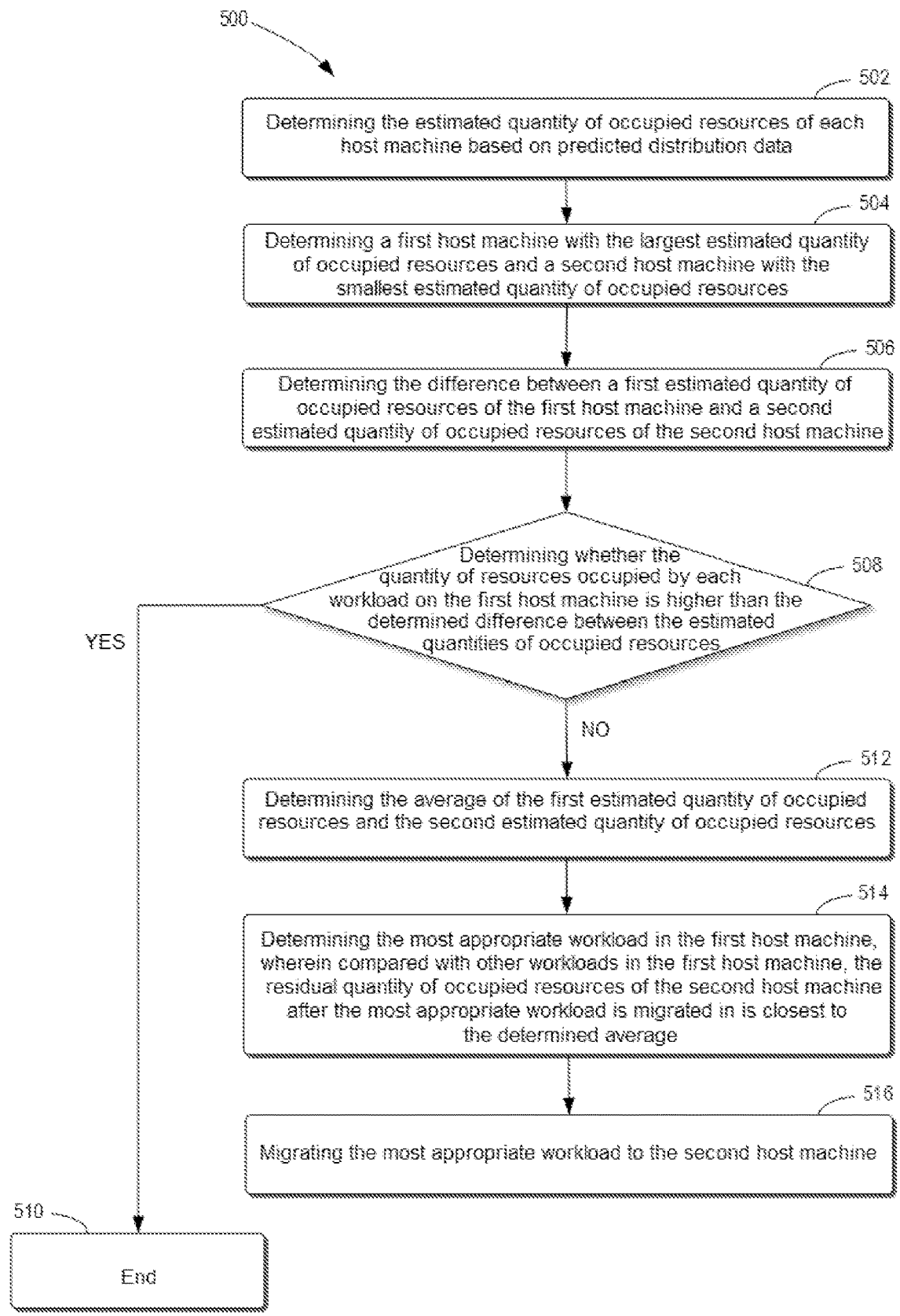
FIG. 5 illustrates a flow chart of an example method of workload migration according to embodiments of the present disclosure.

For example, workload migration can be performed using the method shown in FIG. 5. FIG. 5 illustrates a flow chart of an example specific implementation 500 of workload migration at block 206 in method 200. Method 500 may be performed, for example, by virtual resource manager 130 in FIG. 1.

In the example shown in FIG. 5, at block 502, the estimated quantity of occupied resources of each host machine is determined based on the predicted distribution data. When workload migration is performed for the first time, the estimated quantity of occupied resources can be determined, for example, based on the predicted distribution data obtained in the previous step. When workload migration is performed later, the current quantity of occupied resources can be determined based on the previous workload migration.

At block 504, a first host machine with the largest estimated quantity of occupied resources and a second host machine with the smallest estimated quantity of occupied resources are determined. For example, a high threshold and a low threshold may be set based on the estimated quantity of occupied resources determined at block 502, such that the host machine with the largest estimated quantity of occupied resources is selected as the first host machine and the host machine with the smallest estimated quantity of occupied resources is selected as the second host machine.

At block 506, the difference between the first estimated quantity of occupied resources of the first host machine and the second estimated quantity of occupied resources of the second host machine is determined.

At block 508, it is determined whether the quantity of resources occupied by each workload on the first host machine is higher than the determined difference between the estimated quantities of occupied resources. When the result of determination is yes, the process turns to block 510 and the method ends. When the result of determination is no, the process turns to block 512.

At block 512, the average of the first estimated quantity of occupied resources and the second estimated quantity of occupied resources is determined.

At block 514, the most appropriate workload is determined in the first host machine, wherein compared with other workloads in the first host machine, the residual quantity of occupied resources of the second host machine after the most appropriate workload is migrated in is closest to the determined average. For example, each workload in the first host machine can be traversed, the resources occupied by each workload can be added to the second estimated quantity of occupied resources, then the residual quantities of occupied resources can be compared with the average determined at block 512, and the workload corresponding to the residual quantity of occupied resources closest to the average is selected as the most suitable workload.

At block 516, the most appropriate workload is migrated to the second host machine. At this point, one workload migration is completed.

Analysis of Results

Figure 6:
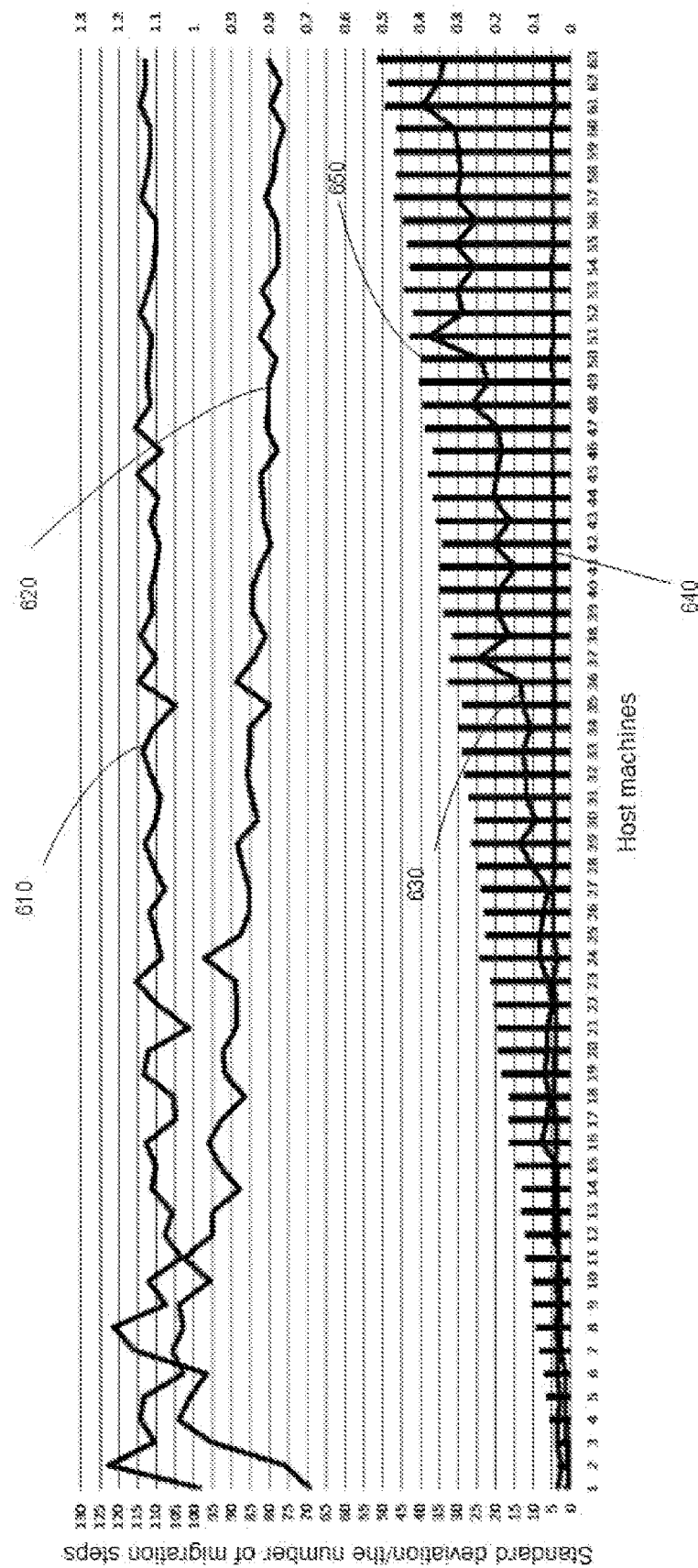
FIG. 6 illustrates a graph of the results obtained by performing an example method according to embodiments of the present disclosure.

FIG. 6 illustrates a graph of example results obtained by performing a method according to embodiments of the present disclosure. The horizontal axis is the number of host machines, the vertical axis on the left is the standard deviation/the number of migration steps, while the vertical axis on the right is consumed time/proportion of the number of migration steps. As shown in FIG. 6, a plurality of workload samples are used on 2 to 63 host machines, where curve 610 is the standard deviation of quantities of occupied resources on all host machines before migration, 640 is the standard deviation after the move, and they use the left vertical axis as the standard. It can be seen that the standard deviation before migration is about 100. After applying the method according to the embodiments of the present disclosure, the standard deviation is below 5.

Bar lines 650 with the left vertical axis as the standard indicate the average numbers of migration steps for the host machines, respectively. It can be seen that as the number of host machines increases, the average number of moving steps also increases.

Curves 620 and 630 use the right vertical axis as the standard. Curve 620 indicates the proportion of the number of moving steps of each host machine, and curve 630 indicates the time taken to execute the method. The proportion of the number of moving steps of each host machine is only about 1 step per host machine on average. The consumed times increase with the number of host machines, but all are below 0.5 seconds.

It can be seen from the results that the number of migration steps is significantly reduced and the resources are well balanced.

Example Device

Figure 7:
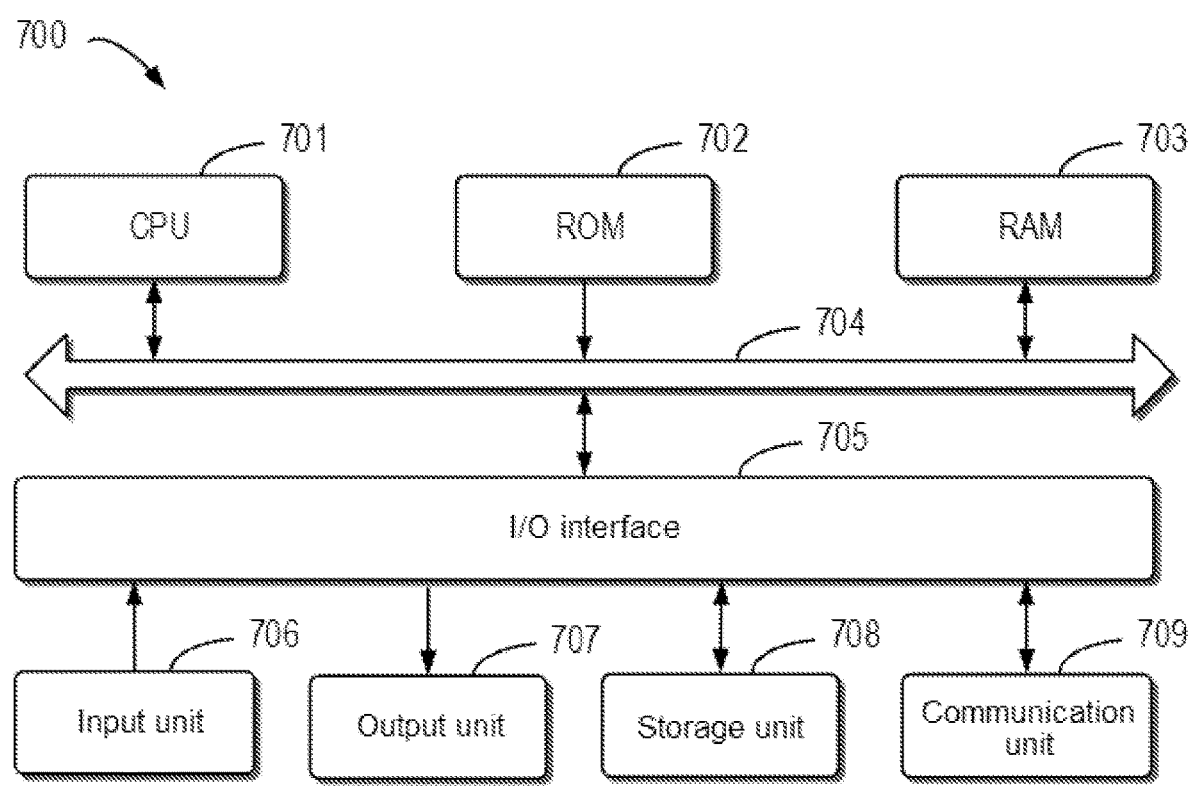
FIG. 7 illustrates a schematic block diagram of an example device that can be used to implement embodiments of the present disclosure.

FIG. 7 illustrates a schematic block diagram of example device 700 that can be used to implement the embodiments of the present disclosure. As shown in FIG. 7, device 700 includes central processing unit (CPU) 701 that may perform various appropriate actions and processing according to computer program instructions stored in read-only memory (ROM) 702 or computer program instructions loaded from storage unit 708 to random access memory (RAM) 703. In RAM 703, various programs and data required for the operation of storage device 700 may also be stored. CPU 701, ROM 702, and RAM 703 are connected to one another through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices via a computer network, such as the Internet, and/or various telecommunication networks.

The various processes and processing described above can be executed by processing unit 701. For example, in some embodiments, method 200 shown in FIG. 2 and method 500 shown in FIG. 5 can be implemented as a computer software program that is tangibly included in a machine-readable medium such as storage unit 708. In some embodiments, part or all of the computer program may be loaded and/or installed to device 700 via ROM 702 and/or communication unit 709. When the computer program is loaded into RAM 703 and executed by CPU 701, one or more actions of the method described above may be implemented.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device that may hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. The network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages, such as Smalltalk, C++, and the like, and conventional procedural programming languages, such as the C language or similar programming languages. The computer-readable program instructions may be executed entirely on a user computer, or partly on a user computer, or as a stand-alone software package, or partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or the block diagrams and combinations of the blocks in the flow charts and/or the block diagrams may be implemented by the computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

The embodiments of the present disclosure have been described above. The above description is illustrative, rather than exhaustive, and is not limited to the disclosed various embodiments. Numerous modifications and alterations are apparent to those of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed here.

The invention claimed is:

1. A method, comprising:
acquiring historical distribution data about a virtualized system, the historical distribution data indicating a historical distribution of resources occupied by virtual machines on each of a plurality of host machines of the virtualized system over a predetermined historical time period;
generating predicted distribution data based on the historical distribution data, the predicted distribution data indicating an estimated distribution of resources occupied by the virtual machines on each of the plurality of host machines over a predetermined future time period, wherein a first host machine of the plurality of host machines has a first estimated quantity of occupied resources that exceeds a high threshold and a second host machine of the plurality of host machines has a second estimated quantity of occupied resources that is below a low threshold; and
when at least one virtual machine of the first host machine occupies a quantity of resources not higher than a difference between the first estimated quantity of occupied resources and the second estimated quantity of occupied resources:
migrating, at least once based on the predicted distribution data, a most appropriate virtual machine of the first host machine to the second host machine, wherein the most appropriate virtual machine comprises a virtual machine of the first host machine which results in a residual quantity of occupied resources of the second host machine after the migration that is closest to
an average of the first estimated quantity of occupied resources and the second estimated quantity of occupied resources as compared to migration of other individual virtual machines of the first host machine.

2. The method according to claim 1, further comprising:
stopping the migrating from being initially performed when the quantity of resources occupied by each virtual machine of the first host machine occupies a quantity of resources that is higher than the difference between the first estimated quantity of occupied resources and the second estimated quantity of occupied resources.

3. The method according to claim 2, further comprising, after the stopping of the migrating from being initially performed, subsequently migrating the most appropriate virtual machine of the first host machine to the second host machine when the quantity of resources occupied by at least one virtual machine of on the first host machine is not higher than the difference between the first estimated quantity of occupied resources and the second estimated quantity of occupied resources.

4. The method according to claim 1, wherein generating the predicted distribution data based on the historical distribution data includes:
generating the predicted distribution data using the historical distribution data as a long short-term memory (LSTM) machine learning model.

5. The method according to claim 1, wherein the most appropriate workload of the first host machine results in a residual quantity of occupied resources of the second host machine after the migration that is closest to the average of the first estimated quantity of occupied resources and the second estimated quantity of occupied resources based on i) the second estimated quantity of occupied resources and ii) for each virtual machine of the first machine, a quantity of resources occupied by that virtual machine.

6. The method according to claim 1, further comprising:
receiving resource requirements of the virtual machines submitted by a user to a virtual resource manager.

7. The method according to claim 6, wherein the virtual resource manager includes a processor, an input/output interface, a memory, and a network interface.

8. The method according to claim 7, wherein a resource schedule associated with the virtual resource manager is based on resources of the plurality of host machines including the first host machine and the second host machine that are within a virtual resource pool, the resources of the plurality of host machines including computing resources, communication resources, and storage resources.

9. An electronic device, comprising:
a processor; and
a memory coupled to the processor, the memory having instructions stored therein that, when executed by the processor, cause the device to execute actions including:
acquiring historical distribution data about a virtualized system, the historical distribution data indicating a historical distribution of resources occupied by virtual machines on each of a plurality of host machines of the virtualized system over a predetermined historical time period;
generating predicted distribution data based on the historical distribution data, the predicted distribution data indicating an estimated distribution of resources occupied by the virtual machines on each of the plurality of host machines over a predetermined future time period, wherein a first host machine of the plurality of host machines has a first estimated quantity of occupied resources that exceeds a high threshold and a second host machine of the plurality of host machines has a second estimated quantity of occupied resources that is below a low threshold; and
when at least one virtual machine of the first host machine occupies a quantity of resources not higher than a difference between the first estimated quantity of occupied resources and the second estimated quantity of occupied resources:
migrating, at least once based on the predicted distribution data, a most appropriate virtual machine of the first host machine to the second host machine, wherein the most appropriate virtual machine comprises a virtual machine of the first host machine which results in a residual quantity of occupied resources of the second host machine after the migration that is closest to
an average of the first estimated quantity of occupied resources and the second estimated quantity of occupied resources as compared to migration of other individual virtual machines of the first host machine.

10. The electronic device according to claim 9, wherein the electronic device is caused to execute actions further including:
stopping the migrating from being initially performed when the quantity of resources occupied by each virtual machine of the first host machine occupies a quantity of resources that is higher than the difference between the first estimated quantity of occupied resources and the second estimated quantity of occupied resources.

11. The electronic device according to claim 9, wherein generating the predicted distribution data based on the historical distribution data includes:
generating the predicted distribution data using the historical distribution data as a long short-term memory (LSTM) machine learning model.

12. A computer program product having a non-transitory computer readable medium which stores a set of instructions, the set of instructions, when carried out by computerized circuitry, causing the computerized circuitry to perform a method of:
acquiring historical distribution data about a virtualized system, the historical distribution data indicating a historical distribution of resources occupied by virtual machines on each of a plurality of host machines of the virtualized system over a predetermined historical time period;
generating predicted distribution data based on the historical distribution data, the predicted distribution data indicating an estimated distribution of resources occupied by the virtual machines on each of the plurality of host machines over a predetermined future time period, wherein a first host machine of the plurality of host machines has a first estimated quantity of occupied resources that exceeds a high threshold and a second host machine of the plurality of host machines has a second estimated quantity of occupied resources that is below a low threshold; and
when at least one virtual machine of the first host machine occupies a quantity of resources not higher than a difference between the first estimated quantity of occupied resources and the second estimated quantity of occupied resources:
migrating, at least once based on the predicted distribution data, a most appropriate virtual machine of the first host machine to the second host machine, wherein the most appropriate virtual machine comprises a virtual machine of the first host machine which results in a residual quantity of occupied resources of the second host machine after the migration that is closest to
an average of the first estimated quantity of occupied resources and the second estimated quantity of occupied resources as compared to migration of other individual virtual machines of the first host machine.

* * * * *